United States Patent

Bunker

[15] 3,668,849

[45] June 13, 1972

[54] LOCKABLE ASSEMBLY AND RAKE-CULTIVATOR IMPLEMENT FOR USING

[72] Inventor: Robert W. Bunker, 1519 West Fourth Avenue, Sault Ste. Marie, Mich. 49783

[22] Filed: Oct. 15, 1970

[21] Appl. No.: 80,995

[52] U.S. Cl. ..................................................56/400.17
[51] Int. Cl. ..................................................A01d 7/00
[58] Field of Search ..............56/400.01, 400.04, 400.17, 56/400.18, 400.19

[56] References Cited

UNITED STATES PATENTS

| | | | |
|---|---|---|---|
| 3,394,536 | 7/1968 | Henne | 56/400.18 |
| 2,481,442 | 9/1949 | Paul | 56/400.17 |
| 1,892,965 | 1/1933 | Rocquin | 56/400.17 |
| 1,837,677 | 12/1931 | Rocquin | 56/400.17 |
| 1,937,775 | 12/1933 | Neuhausen | 56/400.18 |

FOREIGN PATENTS OR APPLICATIONS

| | | | |
|---|---|---|---|
| 261,292 | 6/1913 | Germany | 56/400.19 |
| 599,948 | 5/1948 | Great Britain | 56/400.18 |

*Primary Examiner*—Louis G. Mancene
*Assistant Examiner*—D. L. Weinhold
*Attorney*—Ward, McElhannon, Brooks & Fitzpatrick

[57] ABSTRACT

A novel gripping assembly for holding a strap element to an elongated element by means of a rotatable flat wedging cam element. A rake-cultivator implement which uses the gripping assembly is also described. This implement includes a plurality of tines which fan in and out for cultivating and raking, respectively, by movement of the lockable gripping assembly along the handle of the implement.

9 Claims, 7 Drawing Figures

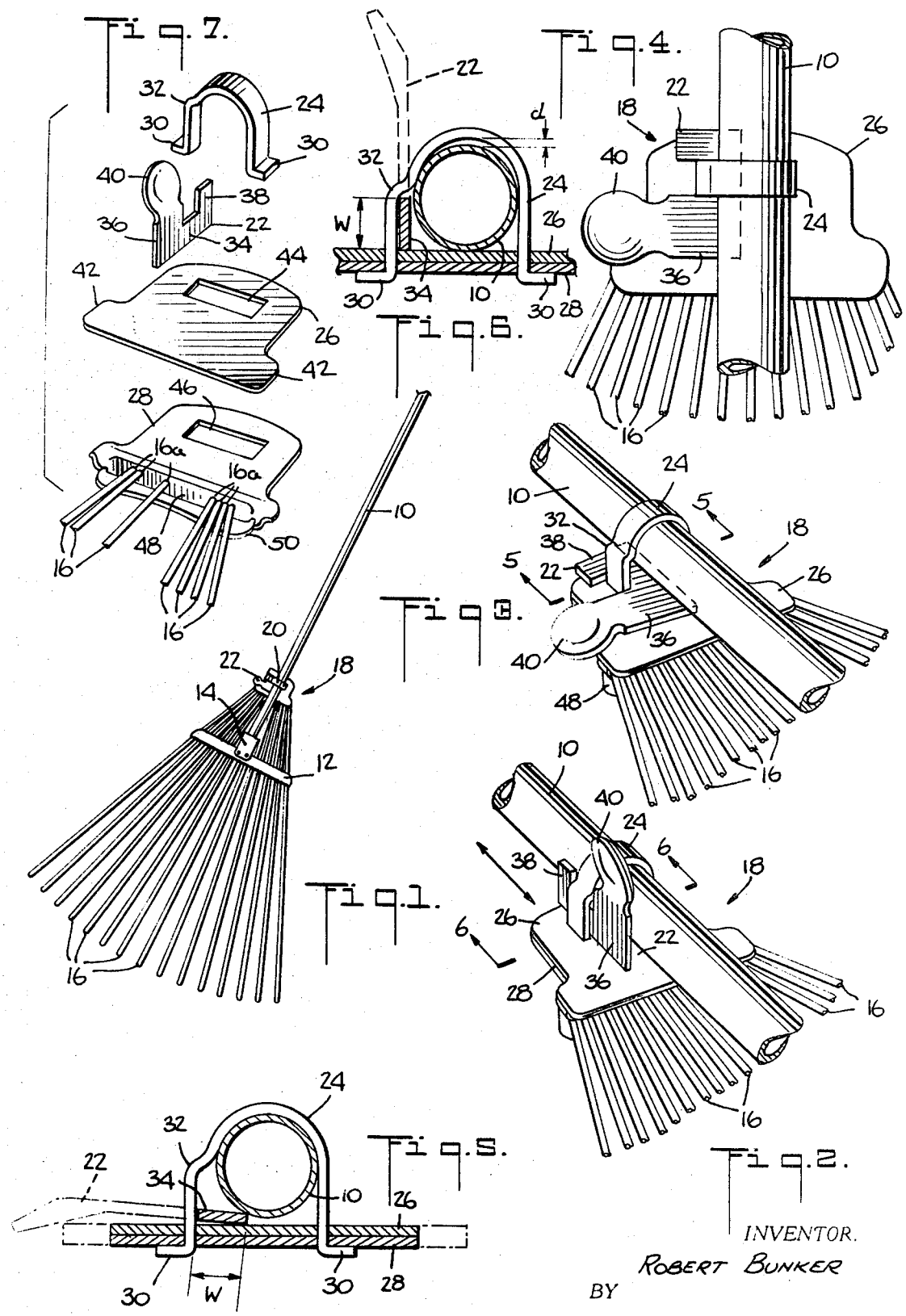

LOCKABLE ASSEMBLY AND RAKE-CULTIVATOR IMPLEMENT FOR USING

This invention relates to clamping arrangements and more particularly, it concerns a novel readily releasable grip which secures a carrier assembly at any desired position along an elongated member. The invention also concerns an improved rake-cultivator implement characterized by an improved adjustable carrier assembly.

The novel clamping arrangements of the present invention are especially well suited for use in improved carrier assemblies for rake-cultivator implements and will be described in that environment. However, it will be readily apparent to those skilled in the art that the present invention, in some of its aspects, is useful for other applications.

Rake-cultivator implements of the type mentioned above are shown and described in U.S. Pat. No. 3,258,903. Basically, these implements comprise an elongated handle with a hand grip at one end and a transverse guide bar with small spaced-apart openings at the other end. A plurality of wirelike rake tines pass through the holes and their ends converge at a carrier member when they are held together. The carrier member is moveable back and forth along the handle and it may be held at any desired position therealong by means of a thumbscrew or a locking lever. When the carrier member is moved toward the guide bar, the tines fan out into raking configuration, and when the carrier member is retracted, the tines come together to form a cultivating implement.

The present invention overcomes certain problems which have been experienced in connection with the manufacture and use of the above-described rake-cultivators. These problems involve the tine end carrier member, its clamping connection to the handle and its holding of the rake tine ends. In previously known rake-cultivator implements, the carrier member requires a complex assembly of parts which are either welded or riveted together and which, in some cases, require thumbscrews and the like for clamping. In addition, the clamping arrangements for such implements required that the handle itself be provided with elongated indentations or grooves. These arrangements were expensive in that they required a number of machining operations on both the handle and on the various components of the carrier member. They also required several welding operations and special assembly procedures. The handles, moreover, suffered from a loss of strength due to the indentations and the clamping effectiveness of the thumbscrew was subject to the strength of the person operating it.

The above-described difficulties have been overcome with the present invention. With the present invention, there are provided novel clamping arrangements which are simple in configuration and which require no welding or special assembly procedures. The novel clamping arrangements of the present invention, moreover, are simple and convenient to use and are very reliable. Moreover, they make possible an improved tine end carrier member.

According to one aspect of the present invention, there is provided a novel clamping arrangement for releasably securing a carrier member at any desired position along an elongated second member. This novel clamping arrangement includes a strap element which cooperates with the carrier member to encircle the elongated second member rather loosely. The cross-section of the elongated member and the surrounding configuration are shaped to provide a space between them for accommodation of a cam. This cam is configured such that as it is rotated it wedges between the elongated member and the encircling structure to hold the various members together.

As illustratively embodied, the elongated member has a circular cross-section while the strap element is U-shaped and cooperates with a flat surface of the first member to form a configuration surrounding the elongated member. The cam is of flat plate-like configuration and it extends into the somewhat triangular space defined by the facing surfaces of the elongated member, the carrier member and one leg of the strap element. The cam is cross-sectionally dimensioned so that it may lie against one leg of the strap element, and in that position will be loosely accommodated in the triangular space. However, when the cam element is rotated, one of its edges moves up along the leg of the strap element toward the flat surface of the first member while the opposite edge of the cam element is forced in wedge-like fashion between the converging curved surface of the elongated second member and flat surface of the first member, thereby tightening the members against each other.

According to a further aspect of the present invention, there is provided a novel rake tine carrier member for rake-cultivator implements such as described above. According to this further aspect, the carrier member is formed from two flat carrier plates, one of which has a tine end accommodating trough pressed into it along one edge and a depressed outer lip on the trough. When the two flat plates are held together they define a front slot leading into the trough. The ends of rake tines pass through this slot and are bent to extend down into the trough where they are held securely though loosely. The base of a U-shaped metal strap element passes closely through aligned slots in both carrier plates and flanges on the ends of the legs of the strap element to prevent it from passing completely through the slot. A locking lever having a flat cam portion is positioned, along with the elongated rake handle, in the space defined between the base and legs of the U-shaped strap element and the facing plate surface. This arrangement serves to hold the entire assembly together; and depending on how the cam portion of the locking lever is positioned, the assembly may be securely tightened on the rake handle; or it may be loosened for sliding movement along the handle. If complete disassembly of parts is desired, this may be achieved by withdrawing the handle completely out from the strap element.

Various further and more specific objects, features and advantages of the invention will appear form the description given below, taken in connection with the accompanying drawings, illustrating by way of example a preferred form of the invention.

FIG. 1 is a perspective view of a rake-cultivator implement in which the present invention is embodied;

FIG. 2 is an enlarged fragmentary view showing in perspective a carrier assembly gripping arrangement for the rake-cultivator implement of FIG. 1 in released condition;

FIG. 3 is a view similar to FiG. 2, but showing the gripping arrangement in locked condition;

FIG. 4 is a plan view of the gripping arrangement of FIG. 3;

FIG. 5 is a section view taken along line 5—5 of FIG. 3;

FIG. 6 is a section view taken along line 6—6 of FIG. 2; and

FIG. 7 is an exploded perspective view showing the configuration and relationship of parts of the elements making up the carrier assembly of FIG. 2.

The rake-cultivator implement of FIG. 1 comprises an elongated tubular handle 10 having a transverse guide bar 12 secured to its lower end by means of a connector 14. A plurality of wire-like rake tines 16 pass loosely through associated holes (not shown) in the guide bar 12, and converge at a carrier assembly 18 which holds the tine ends together in a loose but secure fashion. The carrier assembly, which will be described in detail hereinafter, is held to the handle 10 by means of a strap element 20 and a locking lever 22. The lever 22 is moveable between a release and a locking position. When the lever 22 is in its release position, the carrier assembly 18 is free to be moved up and down along the handle 10 away from and toward the guide bar 12. This up and down movement of the carrier assembly 18 results in a fanning movement of the tines 16 so that they may be spread out for leaf raking as shown in FIG. 1, or they may be brought toward each other for digging or cultivating. When the carrier assembly is brought to a desired position on the handle, the locking lever 22 is moved to its locking position and the carrier assembly 18 and the tines 16 are securely held in place.

The elements making up the carrier assembly 18 are best shown in FIG. 7. These elements include a strap element 24, the locking lever 22, an upper carrier plate 26 and a lower carrier plate 28. The strap element 24 is of generally U-shaped configuration. It may be stamped out of sheet steel and pressed to shape; or it may be formed of any equivalent material and worked to the configuration shown in the drawings. A flange 30 extends outwardly from each end of the element to lock the carrier assembly together, as will be described. One leg of the strap element 24 is displaced outward a small amount, as indicated at 32, in order better to accommodate the locking lever 22. The base of the strap element is rounded to a diameter corresponding to the outer diameter of the handle 10.

The locking lever 22 may also be formed by stamping from sheet steel or equivalent material. The locking lever is essentially flat and includes a central cam portion 34 of rectangular cross-section, a forward flange portion 36 and a rearward flange portion 38 extending outwardly in a common plane from opposite ends, respectively, of the cam portion, and a thumb piece 40 extending out from the forward flange portion. The two flange portions 36 and 38 are displaced from each other by a distance slightly greater than the width of the strap element 24; and as will be seen, these flange portions straddle the strap element in assembly to hold the locking lever 22 in place in both its locking and releasing positions.

The upper carrier plate 26, which may be stamped from sheet steel, is generally rectangular in shape, although it has a pair of wing extensions 42 which project form opposite corners of the front edge thereof. A rectangularly shaped transverse slot 44 is formed in the upper carrier plate 26 parallel to and back from its front edge. This slot is large enough to accommodate the base and legs of the strap element 24, but not the flanges 30.

The lower carrier plate 28 is of generally similar size and configuration to the upper carrier plate 26; and it also may be stamped or otherwise formed of sheet steel or equivalent material. The lower carrier plate is also formed with a rectangular slot 46 which, in assembly, aligns with the slot 44 in the upper carrier plate 26. An elongated trough 48 is stamped or otherwise formed in the lower carrier plate 28 along its front edge. The front edge, extending along the trough 48 is depressed to form a lip 50. It will be appreciated that when the carrier plates 26 and 28 are held together in assembly, the depressed lip 50 defines a front opening slot leading into the trough 48. As can be seen in FIG. 7, this accommodates the rake tines 16 which are bent at right angles, as indicated at 16a, near their ends to extend down and lock into the trough.

The assembly of the above-described elements on the rake handle 10 is shown in FIG. 2. As can be seen, the rake handle 10 is of hollow tubular construction and is circular in cross-section. The handle may be made of steel, aluminum or equivalent material. In forming the assembly, the upper and lower carrier plates 26 and 28 are held together so that the ends 16a of the rake tines 16 are locked in side-by-side position within the trough 48. The rectangular slots 44 and 46 are in alignment at this point and the base of the strap element 24 is pushed through the slots from underneath the plates. The strap element fits closely within the slots and its flanges 30, which abut against the bottom of the lower carrier plate 28, as shown in FIG. 6, prevent the strap element from passing completely through the slots. The locking lever 22 is then passed through the opening defined by the strap element 24 and the lower carrier plate 26, as shown in FIG. 2 and 6. As can be seen in FIG. 2, the forward and rearward flange portions 36 and 38 straddle the width of the strap element 24 while the cam portion 34 remains inside the strap element. The handle 10 is then passed through the opening defined by the strap element and the lower carrier plate, alongside the locking lever 22, as shown in FIGS. 2 and 6. It will be appreciated that this has the effect of locking the entire assembly together in rather loose fashion. Thus, the locking lever 22 does not now have sufficient clearance to permit either of its flange portions 36 or 38 to pass through the strap element 24. Also, the handle 10 prevents the strap element from passing back through the slots 44 and 46 in the carrier plates; and the strap element flanges 30 prevent the strap element 24 from passing through the slots 44 and 46 in the opposite direction. As can be seen in FIG. 6, the cross-sectional dimensions of the handle 10 and the strap element 24 are such as to leave a finite clearance "$d$" to ensure looseness and to permit the carrier assembly to move easily along the handle 10 without binding. The clearance "$d$", however, is sufficiently small to prevent the carrier plates from separating enough to allow release of the tine ends 16a from the trough 48.

When the carrier assembly 18 is in its loosely held-together condition, as shown in FIGS. 2 and 6, and as described above, the locking lever 22 is positioned so that its cam portion 34 is oriented such that its width W (FIG. 6) extends perpendicularly from the upper carrier plate 26 and lies against the outwardly displaced leg region 32 of the strap element 24. The strap element 32 and the cam portion 34 are so dimensioned that in this orientation of the cam portion it is held loosely in position by the strap element.

The carrier assembly 18 is locked in position on the handle 10 by pressing on the thumb piece 40 of the locking lever 22 so that it becomes rotated to the position shown in FIGS. 3, 4 and 5. In this position of the locking lever, the width W of its cam portion 34 lies against the upper carrier plate 26. One edge of the cam portion abuts against the leg of the strap element 24, while the opposite edge is wedged into the converging region defined by the curved outer surface of the handle 10 and the flat surface of the upper carrier plate 26. The width W of the cam portion 34 is chosen such that in the position shown in FIGS. 3, 4 and 5, it is forced between the handle and carrier plate to lock itself and the handle between the carrier plate and the strap element 24. The strap element 24, in turn, acts through its flanges 30 to hold the entire assembly together and to hold the upper and lower carrier plates 26 and 28 tightly against each other so that the rake tines 16 are held securely in place. The leg of the strap element 24, against which the other edge of the cam portion 34 abuts, serves to hold the cam portion so that its one edge remains tightly wedge between the handle 10 and the upper carrier plate 26. This action also forces the strap element 24 in a manner tending to spread its legs so that the flanges 30 are positively prevented from being drawn through the carrier plate slots 44 and 46.

It will be appreciated that as the locking lever 22 is moved toward its locking position as illustrated in FIG. 5, its contact with the leg of the strap element 24 produces a camming effect which forces the other edge of the cam portion 34 into wedging contact between the handle 10 and the carrier plate 26. This camming effect is characterized by a very large mechanical advantage due to the fact that the point of wedging action is also effectively the fulcrum about which the locking lever 22 pivots.

The wedging action on one side of the cam portion 34 of the locking lever 22 and the frictional restraint imposed by the strap 24 on the opposite edge of the cam portion hold the locking lever securely in position with the handle and carrier plate assembly very tightly locked together. However, the assembly may be easily unlocked by pushing on the thumb piece 40 and rotating the locking lever 22 to its release position. Because of the large mechanical advantage inherent in the cam and wedging arrangement, the forces required to effect locking and unlocking are not excessive.

When the locking lever 22 is in its release position, the carrier assembly 18 is held loosely though securely on the handle 10; and it may be moved up and down along the handle to any desired new position at which point the locking lever may be returned to its lock position so that the carrier assembly 18 will again become tightly locked to the handle. Should it be desired to disassemble the carrier assembly 18 entirely for any reason, for example to replace a rake tine, this may be achieved simply by moving the lever 22 to its release position, and withdrawing the handle 10 from the carrier assembly 18. The plates 26 and 28 may then be separated to release the rake tines. Also, any other elements such as the strap 24, the locking lever 22 or the plates 26 and 28 themselves may be separated and replaced, if desired.

It will be appreciated from the foregoing that the present invention provides a very reliable and effective gripping arrangement which is easy to manipulate. This gripping arrangement, moreover, lends itself to economical and efficient fabrication in that its components may all be fabricated by stamping or similar procedures, and its assembly may be undertaken without resort to complicated and expensive welding, riveting, threading or pressing procedures.

Having described the invention with particularity with reference to the preferred embodiment of the same, it will be obvious to those skilled in the art, after understanding the invention, that various changes and modifications may be made therein without departing from the spirit and scope of the invention; and the appended claims are intended to cover such changes and modifications as are within the scope of the invention.

What is claimed is:

1. A rake-cultivator implement comprising an elongated handle having a transverse guide bar secured at one end of the handle, a plurality of wire-like rake tines extending through associated guide openings distributed along said guide bar, a carrier assembly moveable along the handle for adjusting the position of one end of each of the rake tines with respect to said guide bar, said carrier assembly comprising tine end receiving means for holding said one end of said rake tines loosely, though securely, a strap element secured to said carrier assembly and defining therewith an opening through which said handle passes, said opening being characterized by at least one corner formed by two flat, substantially perpendicular, surfaces, said handle presenting a rounded outer surface facing said corner, and a cam element moveable in the space between said corner and said rounded surface, said cam element having a flat camming portion which, in a first position of said camming element, lies against one of said flat, substantially perpendicular, surfaces with one edge of said cam element lodged in said corner and the opposite edge of said cam element wedged between said one surface and said handle, whereby said handle is forced into tight locking engagement with said strap element and carrier assembly and which, in a second position of said camming element, lies loosely in said opening with said opposite edge nearer said corner, whereby said handle is free for longitudinal movement in said opening with respect to said carrier assembly.

2. A rake-cultivator implement according to claim 1, wherein said strap element is of generally U-shaped configuration and wherein said carrier assembly includes a flat portion extending between the legs of said U-shaped strap member to form said corner.

3. A rake-cultivator implement according to claim 2, wherein one leg of said strap element is displaced laterally to provide a loose accommodation for said cam member in said second position.

4. A rake-cultivator implement according to claim 1, wherein said cam element comprises a locking lever having flange portions at opposite ends of said camming portion for straddling said strap element and maintaining said locking lever axially in place with respect to said strap element in each of its said positions.

5. A rake-cultivator implement according to claim 4, wherein a thumb-engaging portion extends outwardly from one of said flange portions.

6. A rake-cultivator implement according to claim 2, wherein the legs of said strap element pass through an opening in said carrier member and are secured to said carrier member by means of flange extensions which project outwardly from the ends of the legs of said strap element.

7. A rake-cultivator implement according to claim 2, wherein said carrier assembly comprises a plurality of plate-like members having cooperating configurations which, when the plate-like members are together, define tine end holding cavities, said plate-like members having aligned openings, the legs of said U-shaped strap element extending through said openings and secured to the plate-like member furthest from its base, whereby said carrier assembly is held tightly together upon movement of said cam element to its said first position.

8. A moveable carrier assembly according to claim 7, wherein at least one of said plate-like members is formed with a trough and a depressed lip to define a tine end cavity and a slot leading thereinto when the plates are held together in assembly.

9. A moveable carrier assembly according to claim 7, wherein the legs of said strap member are bent outwardly at their ends to form flange portions which abut the plate-like member surface furthest removed and facing away from said elongated member.

* * * * *

UNITED STATES PATENT OFFICE
CERTIFICATE OF CORRECTION

Patent No. 3,668,849　　　　　　Dated June 13, 1972

Inventor(s) Robert W. Bunker

It is certified that error appears in the above-identified patent and that said Letters Patent are hereby corrected as shown below:

Column 6, line 36, delete the phrase "moveable carrier assembly" and substitute the phrase --rake-cultivator implement--;

line 41, delete the phrase "moveable carrier assembly" and substitute the phrase --rake-cultivator implement--.

Signed and sealed this 2nd day of Janaury 1973.

(SEAL)
Attest:

EDWARD M. FLETCHER, JR.　　　　　　ROBERT GOTTSCHALK
Attesting Officer　　　　　　　　　　Commissioner of Patents